(12) United States Patent
Chou et al.

(10) Patent No.: US 8,422,170 B2
(45) Date of Patent: Apr. 16, 2013

(54) SUSPENSION HAVING BONDING PADS WITH SOLDER LAYERS, MANUFACTURING METHOD OF A SUSPENSION, AND CONNECTING METHOD BETWEEN A SUSPENSION AND A SLIDER

(75) Inventors: Shen kuang Sidney Chou, HongKong (CN); Chi hung Yuen, HongKong (CN); Yan bin Wang, DongGuan (CN); Shu ming Zhang, DongGuan (CN); Bin Zhao, DongGuan (CN); Ming liang Lin, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/238,026

(22) Filed: Sep. 21, 2011

(65) Prior Publication Data

US 2013/0070369 A1 Mar. 21, 2013

(51) Int. Cl.
*G11B 5/56* (2006.01)
(52) U.S. Cl.
USPC ....................................................... 360/234.5
(58) Field of Classification Search ................ 360/234.5
See application file for complete search history.

(56) References Cited

U.S. PATENT DOCUMENTS

| | | | | |
|---|---|---|---|---|
| 5,956,208 A | * | 9/1999 | Kawazoe | 360/234.5 |
| 6,665,151 B1 | * | 12/2003 | Bonin et al. | 360/294.3 |
| 6,728,068 B1 | * | 4/2004 | Himes et al. | 360/234.5 |
| 7,417,827 B2 | * | 8/2008 | Tsuchida et al. | 360/234.5 |
| 7,643,249 B2 | * | 1/2010 | Motonishi et al. | 360/234.5 |
| 7,719,796 B2 | * | 5/2010 | Takahashi et al. | 360/244.8 |
| 2007/0002494 A1 | * | 1/2007 | Takahashi et al. | 360/234.6 |
| 2012/0033318 A1 | * | 2/2012 | Boutaghou et al. | 360/31 |

* cited by examiner

*Primary Examiner* — Mark Blouin
(74) *Attorney, Agent, or Firm* — Nixon & Vanderhye PC (57) ABSTRACT

A suspension includes a flexure and a plurality of electrical traces formed on the flexure. Each electrical trace has a trace body and a bonding pad arranged for connecting with a slider, and the bonding pad is a free end before connecting with the slider and is capable of bending to the trace body flexibly, and the bonding pad includes a trace body layer and a solder layer formed on the trace body layer, thereby the bonding pads of the electrical traces connecting with the slider by reflowing the solder layer. The present invention uses no extra solder balls, so as to reduce the manufacturing cost and the corresponding apparatus cost. The invention also discloses a manufacturing method of a suspension, and a connecting method for a suspension and a slider.

12 Claims, 12 Drawing Sheets

SUSPENSION HAVING BONDING PADS WITH SOLDER LAYERS, MANUFACTURING METHOD OF A SUSPENSION, AND CONNECTING METHOD BETWEEN A SUSPENSION AND A SLIDER

FIELD OF THE INVENTION

The present invention relates to information recording disk drive devices and, more particularly, to a suspension having bonding pads with a solder layer respectively, a head gimbal assembly (HGA) and a disk drive unit with the same. Additionally, the present invention also relates to a manufacturing method of a suspension, and a connecting method between a suspension and a slider.

BACKGROUND OF THE INVENTION

Figure 1A:
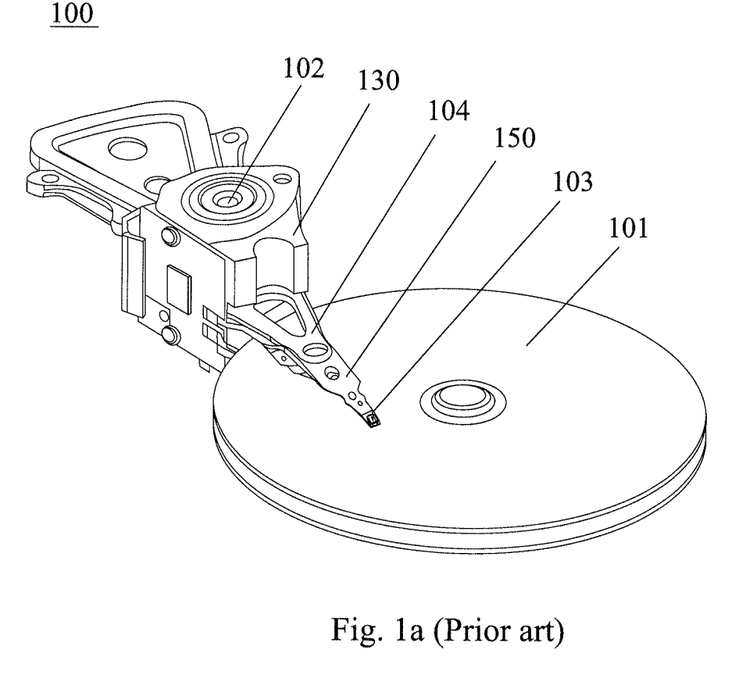
FIG. 1a is a perspective view of a conventional disk drive unit.

Hard disk drives are common information storage devices. Referring to FIG. 1a, a conventional disk drive 100 essentially consists of a series of rotatable disks 101 mounted on a spindle, and a Head Stack Assembly (HSA) 130 which is rotatable about an actuator arm axis 102 for accessing data tracks on disks during seeking. The HSA 130 includes at least one arm 104 and HGA 150.

Figure 1B:
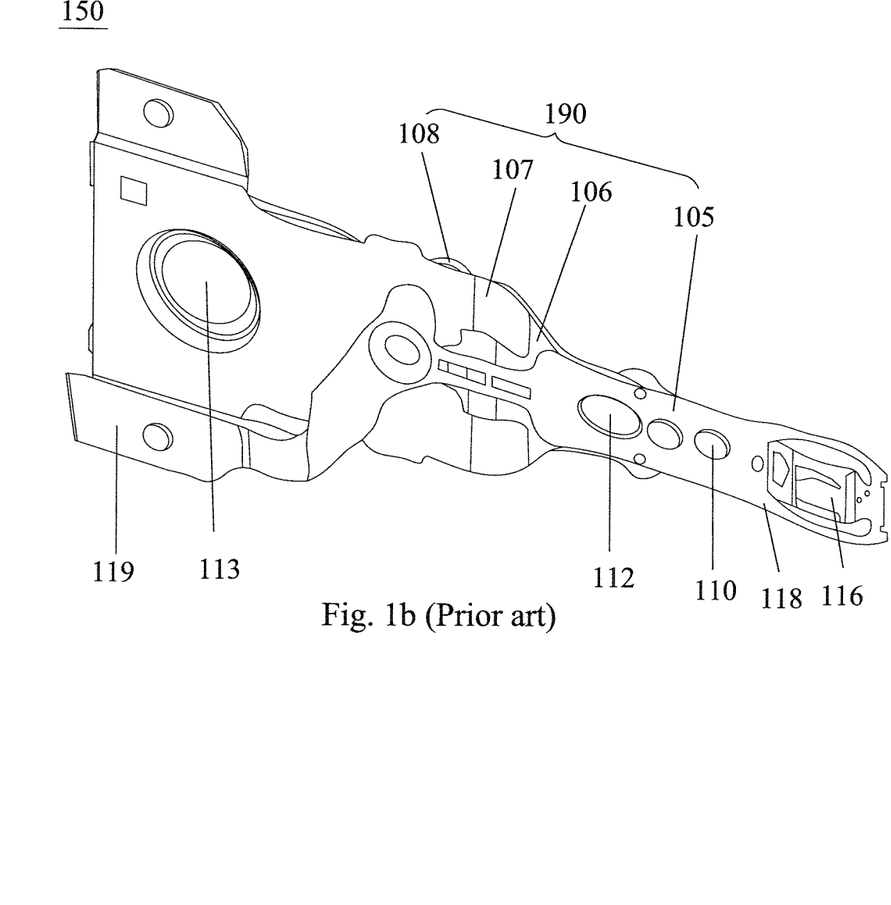
FIG. 1b is a perspective view of a conventional HGA.

Referring to FIG. 1b, the HGA 150 includes a slider 103 (shown in FIG. 1c) having a reading/writing transducer (not shown) imbedded therein, and a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

Concretely, the suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. And the load beam 106 is welded with the flexure for increasing the strength of the entire structure.

The base plate 108 is used to enhance structure stiffness of the whole HGA 150. A mounting hole 113 is formed on one end of the base plate 108 for mounting the whole HGA 150 to the motor arm 104 (referring to FIG. 1a). Another hole 110 is formed on the other end of the base plate 108, through which the base plate 108 connects with the flexure 105.

The flexure 105 is made of flexible material and runs from the hinge 107 to the load beam 106. The flexure 105 has a proximal end 119 adjacent the hinge 107 and a distal end 118 adjacent the load beam 106. A locating hole (not shown) is formed on the distal end 118 of the flexure 105 and aligned with the locating hole 112 of the load beam 106, thus obtaining a high assembly precision. A suspension tongue 116 is provided at the distal end 118 of the flexure 105 to carry the slider 103 thereon.

Figure 1C:
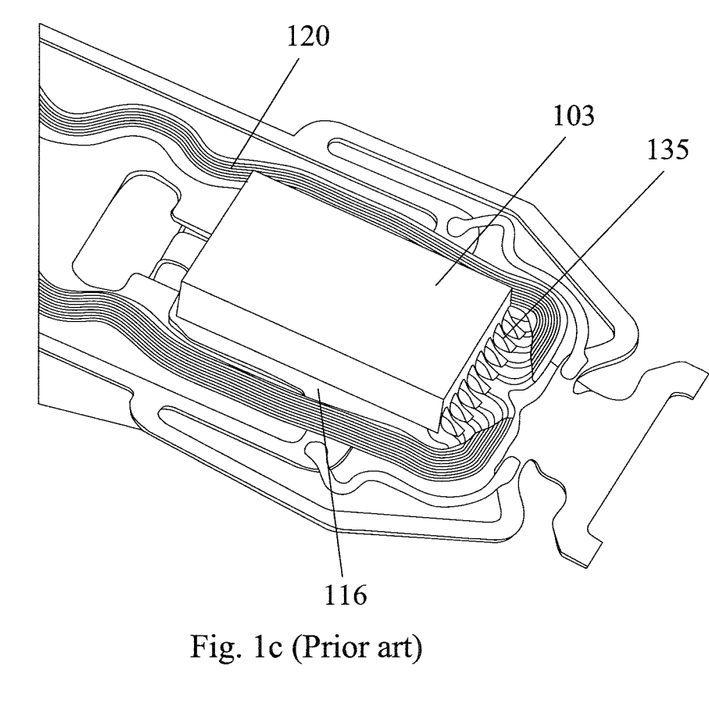
FIG. 1c is a partial detailed plan view of the HGA shown in FIG. 1b.

FIG. 1c shows a more detailed structure of the HGA 150 shown in FIG. 1b. As illustrated in the figure, a plurality of electrical traces 120 is formed on the flexure 105 along length direction thereof. One end of the electrical traces 120 is electrically connected to a preamplifier (not shown), and the other end thereof extends into the suspension tongue 116. The suspension tongue 116 has a plurality of bonding pads (not shown) formed thereon for coupling the slider 103. Concretely, the slider 103 is mounted on the suspension tongue 116, and the slider 103 has multiple bonding pads (not shown) formed thereon. The bonding pads of the slider 103 and the bonding pads of the suspension tongue 116 are electrically connected together by solder balls 135.

The following is a description of a conventional solder ball connection method for connecting the slider 103 to the suspension tongue 116.

Figure 2:
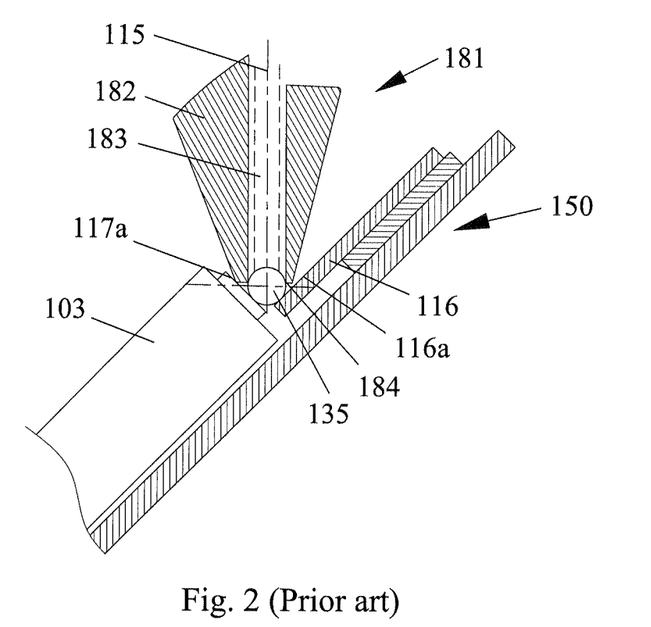
FIG. 2 is a cross section view of the major portion of the HGA, and a partial cross sectional view of a conventional soldering device.

FIG. 2 is a cross section view of the major portion of the HGA 150, and a partial cross sectional view of a conventional soldering device (not shown entirely). The load beam 106 is not illustrated here so as to simplify the description.

When carrying out a solder ball connection, the inclined HGA 150 is held by a holder (not shown) so that the connection surface 117a of the slider 103 and the connection surface 116a of the suspension tongue 116 face each other substantially perpendicular and each of those connection surfaces 117a and 116a is inclined substantially at 45° relative to a line 115.

The conventional soldering device (not shown) commonly includes a nozzle device 181, a solder ball feeding device (not shown), a laser unit (not shown) and a pressurized gas supplying unit (not shown). As shown in FIG. 2, the nozzle device 181 is tube shape which has a housing 182, an inner hollow passage 183 and a tip called nozzle 184. The solder ball feeding device stores many solder balls 135 and delivers one solder ball 135 to the nozzle 184 from the upper opening of the housing 182 through its passage 183 after the nozzle 184 is disposed at a predetermined position. At this time, the pressurized gas supplying unit supplies a nitrogen gas ($N_2$) so as to prompt the solder ball 135 to move to the nozzle 184 with the action of the gravity.

In this state, the laser unit applies a laser beam to the solder ball 135 through the inner hollow passage 183 of the nozzle device 181 so as to make the solder ball 135 reflow. The solder ball 135 is then melted in this reflowing, getting both connection surfaces 117a and 116a of the slider 103 and the suspension tongue 116 wet and connected together. The nitrogen gas supplied at this time presses the melted solder against each connection surfaces 117a, 116a and covers the solder so as to be prevented from oxidation.

With the development of the compact and small-size slider, the bonding process between the slider and the suspension becomes more and more difficult. When the solder ball is supplied between the bonding pad of the slider and the bonding pad of the suspension by the solder ball feeding device, the accurate motion and location is difficult, which weakens the connection precision. In addition, as described above, the conventional connection method needs to provide the extra solder balls by the solder ball feeding device, thus the manufacturing cost and the apparatus cost are quite high, which is undesired to the manufacturer.

Thus, there is a need for an improved suspension, HGA and disk drive unit, a corresponding manufacturing method of a suspension and a method of connecting a suspension and a slider that do not suffer from the above-mentioned drawbacks.

SUMMARY OF THE INVENTION

One aspect of the present invention is to provide a suspension having bonding pads with a solder layer formed thereon thereby connecting with a slider by reflowing the solder layer, in which extra solder balls are omitted, so as to reduce the manufacturing cost and the corresponding apparatus cost.

Another aspect of the present invention is to provide an HGA with a suspension, whose bonding pad has a solder layer formed thereon thereby connecting with a slider by reflowing the solder layer, and extra solder balls are omitted, so as to reduce the manufacturing cost and the corresponding apparatus cost.

Yet another aspect of the present invention is to provide a disk drive unit with a suspension, whose bonding pad has a solder layer formed thereon thereby connecting with a slider by reflowing the solder layer, and extra solder balls are omitted, so as to reduce the manufacturing cost and the corresponding apparatus cost.

Yet another aspect of the present invention is to provide a manufacturing method of a suspension, which the bonding pad has a solder layer formed thereon thereby connecting with a slider by reflowing the solder layer, and extra solder balls are omitted, so as to reduce the manufacturing cost and the corresponding apparatus cost. Additionally, the manufacturing method is quite simple.

Yet another aspect of the present invention is to provide a connecting method between a suspension and a slider, which the bonding pad of the suspension has a solder layer formed thereon thereby connecting with the slider by reflowing the solder layer, and extra solder balls are omitted, so as to reduce the manufacturing cost and the corresponding apparatus cost. Additionally, the connecting method is simple and stable.

To achieve above objectives, a suspension for an HGA includes a flexure and a plurality of electrical traces formed on the flexure. Each electrical trace has a trace body and a bonding pad arranged for connecting with a slider of the HGA, and the bonding pad is a free end before connecting with the slider and is capable of bending to the trace body flexibly, and the bonding pad includes a trace body layer and a solder layer formed on the trace body layer, thereby the bonding pads of the electrical traces connecting with the slider by reflowing the solder layer.

Preferably, the solder layer is made of Sn based material.

Alternatively, the solder layer is made of gold.

Preferably, the solder layer is formed on the trace body layer by plating or sputtering.

Preferably, the bonding pad is vertical with the trace body after connecting with the slider.

An HGA includes a slider and a suspension for supporting the slider. The suspension includes a flexure and a plurality of electrical traces formed on the flexure. Each electrical trace has a trace body and a bonding pad arranged for connecting with a slider of the HGA, and the bonding pad is a free end before connecting with the slider and is capable of bending to the trace body flexibly, and the bonding pad includes a trace body layer and a solder layer formed on the trace body layer, thereby the bonding pads of the electrical traces connecting with the slider by reflowing the solder layer.

Preferably, the solder layer is made of Sn based material.

Alternatively, the solder layer is made of gold.

Preferably, the solder layer is formed on the trace body layer by plating or sputtering.

Preferably, the bonding pad is vertical with the trace body after connecting with the slider.

A disk drive unit includes an HGA including a slider and a suspension that supports the slider, a drive arm connected to the HGA, a series of disks and a spindle motor operable to spin the disks. The suspension includes a flexure and a plurality of electrical traces formed on the flexure. Each electrical trace has a trace body and a bonding pad arranged for connecting with a slider of the HGA, and the bonding pad is a free end before connecting with the slider and is capable of bending to the trace body flexibly, and the bonding pad includes a trace body layer and a solder layer formed on the trace body layer, thereby the bonding pads of the electrical traces connecting with the slider by reflowing the solder layer.

A manufacturing method of a suspension for an HGA, includes steps of:
forming a trace body;
forming a solder layer on the surface of one end of the trace body, so as to form a bonding pad which is a free end and is capable of bending to the trace body flexibly, so as to connect with a slider of the head gimbal assembly; and
mounting the trace body on a flexure of the suspension.

A connecting method between a suspension and a slider, includes steps of:
forming a trace body;
forming a solder layer on the surface of one end of the trace body, so as to form a bonding pad which is a free end and is capable of bending to the trace body flexibly;
mounting the trace body on a flexure of the suspension;
aligning the bonding pad with a pad of the slider face to face; and
reflowing the solder layer of the bonding pad, thereby connecting the suspension with the slider.

In comparison with the prior art, the bonding pad of the suspension of the present invention has a solder layer formed thereon, thereby the slider can be connected with the suspension by fusing the solder layer to the pads on the slider, which the extra solder balls are omitted, thus the manufacturing cost is reduced, and in turn, the solder ball feeding device is omitted, which can reduce the apparatus cost as well. Additionally, the manufacturing method of the suspension and the connecting method between the suspension and the slider are simple and stable, which is desired to the manufacturer.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a suspension for an HGA of a disk drive unit, which has bonding pads with a solder layer thereby connecting with a slider by reflowing the solder layer, which extra solder balls are omitted, thereby reducing the manufacturing cost and the corresponding apparatus cost.

Figure 3:
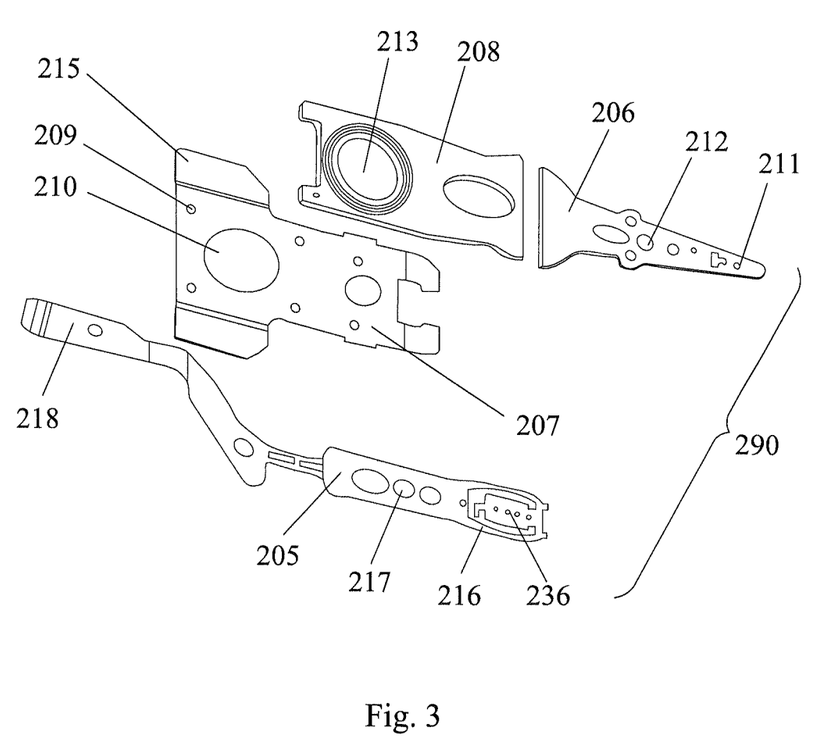
FIG. 3 is an exploded perspective view of a suspension according to an embodiment of the present invention.

FIG. 3 shows an embodiment of a suspension of the present invention. As illustrated in FIG. 3, a suspension 290 including a load beam 206, a base plate 208, a hinge 207 and a flexure 205, all of which are assembled with each other.

Referring to FIG. 3, the load beam 206 is used to transfer load forces to the flexure 205 and a slider (not shown here) mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212 is formed on the load beam 206 for aligning itself with the flexure 205. A dimple 211 is formed on the load beam 206 to support the flexure 205 at a position corresponding to a center of the slider. By this engagement of the dimple 211 with the flexure 205, the load forces can be transferred to the slider uniformly.

The base plate 208 is used to enhance structure stiffness of the whole suspension 290 and may be made of rigid material such as stainless steel. A mounting hole 213 is formed on one end of the base plate 208 for mounting the whole suspension 290 to a motor arm of a disk drive unit.

The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at a plurality of pinpoints 209 distributed on the hinge 207. Two hinge struts 216 are extended from the two sides of the hinge 207 to partially mount the hinge 207 to the load beam 206.

Figure 4:
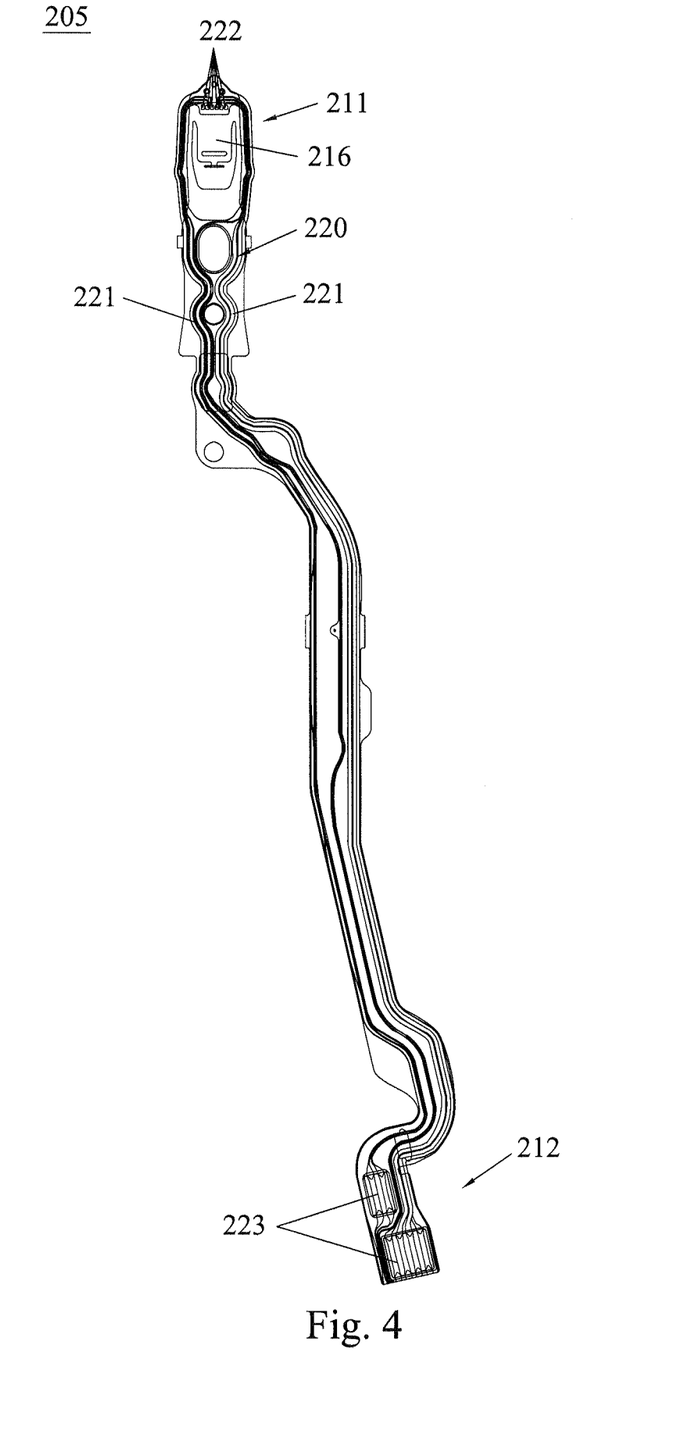
FIG. 4 is an top plan view of a flexure of the suspension shown in FIG. 3.

As shown in FIG. 4, the flexure 205 runs from the hinge 207 to the load beam 206. The flexure 205 has a leading portion 211 and a tailing portion 212 opposite to the leading portion 211. A suspension tongue 216 is provided at the leading portion 211 of the flexure 205 to support a slider 203 (referring to FIG. 6) thereon. A plurality of electrical traces 220 is formed on the flexure 205 along length direction thereof. More specifically, the electrical traces 220 extend from the leading portion 211 to the tailing portion 212.

More concretely, each electrical trace 220 has a trace body 221 and a bonding pad 222 formed on one end of the trace body 221. The bonding pad 222 is a free end before connecting with the slider 203. A plurality of bonding pads 222 is located at the suspension tongue 216 on the leading portion 211, so as to connect with the slider 203 carried on the suspension tongue 216. On the other end of the trace body 221, several bonding pads 223 also are positioned at the tailing portion 212, so as to connect with a flexure printed cable (not shown).

Figure 5:
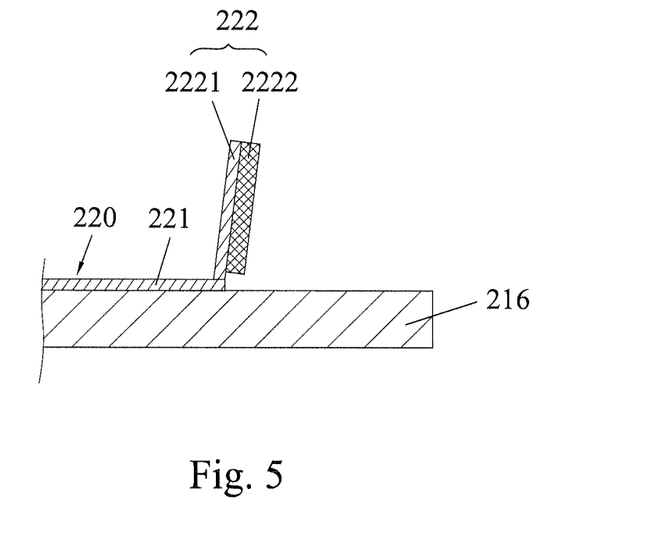
FIG. 5 shows a detailed structure of the bonding pad of the electrical traces.

Now, a detailed description of the bonding pads 222 is followed.

As shown in FIG. 5, the bonding pad 222 is capable of bending to the trace body 221 flexibly. The bonding pad 222 includes a trace body layer 2221 connected with the trace body 221, and a solder layer 2222 formed on the trace body layer 2221. Based on the design of the bonding pad 222, the electrical trace 220 can be connected with the slider 203 by fusing the solder layer 2222 to the pads 2031 (referring to FIG. 7*a*) on the slider 203. Comparing with the prior art, an extra electrical solder ball is omitted, thus the manufacturing cost is reduced.

Concretely, preferably, the solder layer 2222 can be formed on the trace body layer 2221 by plating, sputtering or other surface curing method. And the solder layer 2222 can be made of Sn based material, such as Sn—Ag—Cu alloy, or gold material, which is not limited here. Preferably, the bonding pad 222 of the suspension 290 is vertical with the trace body 221 after connecting with the slider 203.

Figure 6:
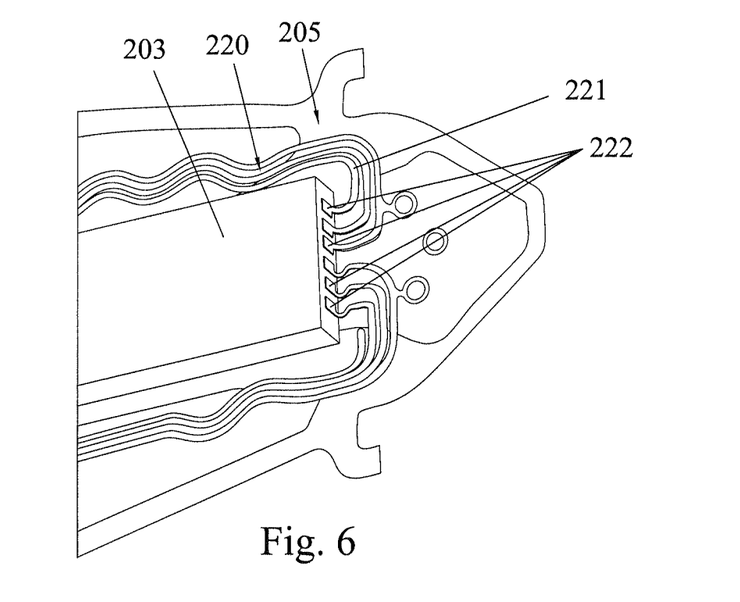
FIG. 6 is a perspective view of an HGA according to an embodiment of the present invention.

After the slider 203 is mounted on the suspension tongue 216, an HGA 200 is formed. As shown in FIG. 6, the partial HGA 200 includes the suspension 290 (not shown in this figure) and the slider 203 carried on the suspension 290. The suspension 290 includes the load beam 206, the base plate 208, the hinge 207 and the flexure 205, all of which are described above.

Figure 7A:
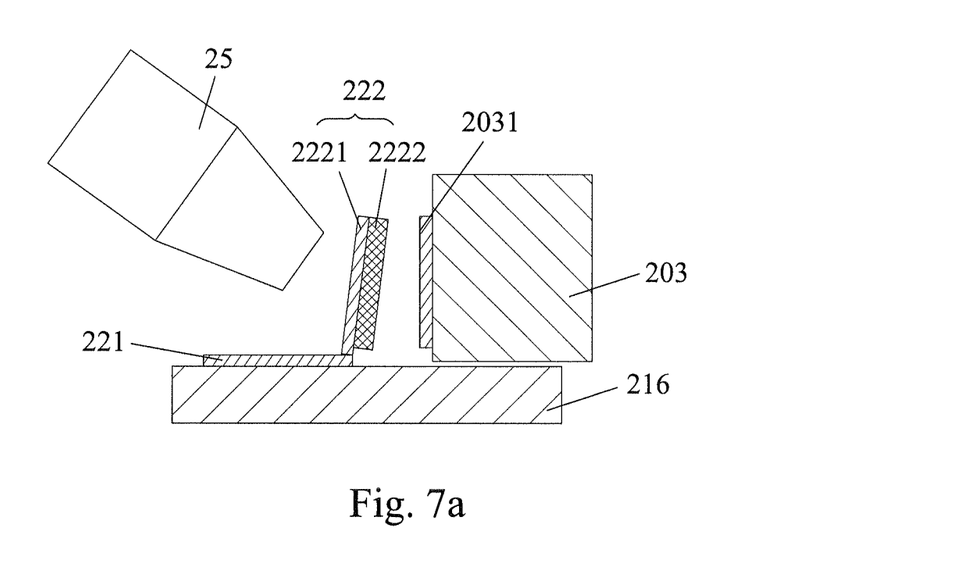
FIG. 7a is a partial view of the suspension and the slider before connecting, which shows the bonding pads of the suspension is separated from the pads of slider.
Figure 7B:
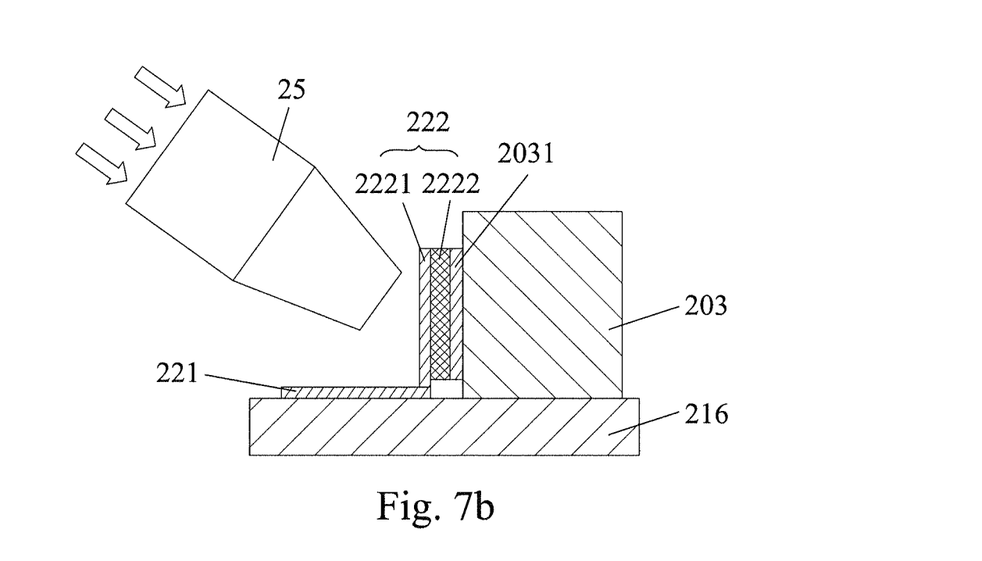
FIG. 7b is another partial view of the suspension and the slider before the laser emitting, in which the bonding pads of the suspension contact with the pads of slider.
Figure 7C:
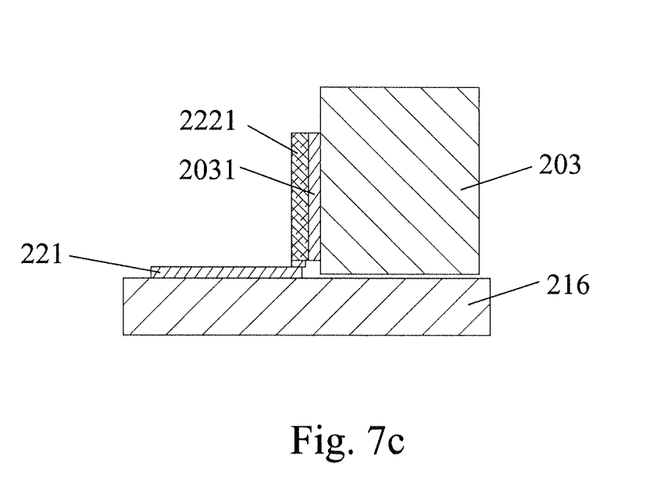
FIG. 7c is a partial view of the suspension and the slider after the laser emitting, in which the solder layer of the bonding pad is fused between the trace body layer and the pad of the slider.

Now a connecting method between the slider 203 and the suspension 290 is explained. Commonly, several pads 2031 are formed on the trailing edge of the slider 203 as shown in FIG. 7*a*. Before connecting, place the slider 203 on the suspension tongue 216, and then move the slider 203 thereby contacting the bonding pads 222 on the flexure 205, and align the pads 2031 with the bonding pads 222 face to face respectively. At the moment, the solder layer 2222 of the bonding pad 222 contact to the pad 2031 closely due to the bonding pad 222 is capable of bending flexibly. Then a laser beam emitted by a laser generator 25 is focused on the bonding pad 222, specifically, the laser beam is focused on the trace body layer 2221 of the bonding pad 222, as shown in FIG. 7*b*. Thus, the solder layer 2222 will be melted by the high energy, by which the trace body layer 2221 is connected with the pad 2031. Repeat the bonding process till every bonding pad 222 is connected with every pad 2031. Therefore, the connection between the slider 203 and the suspension 209 is finished, as shown in FIG. 7*c*.

Alternatively, the reflowing of the solder layer 2222 can be carried out by ultrasonic bonding machine (UBM).

In comparison with the prior art, the slider 203 is connected with the suspension 290 by fusing the solder layer 2222 formed on the trace body layer 2221, which the extra solder balls are omitted, thus the manufacturing cost is reduced, and in turn, the solder ball feeding device is omitted, which can reduce the apparatus cost as well. Additionally, the connecting method of the present invention is simple and stable, which is desired to the manufacturer.

Figure 8:
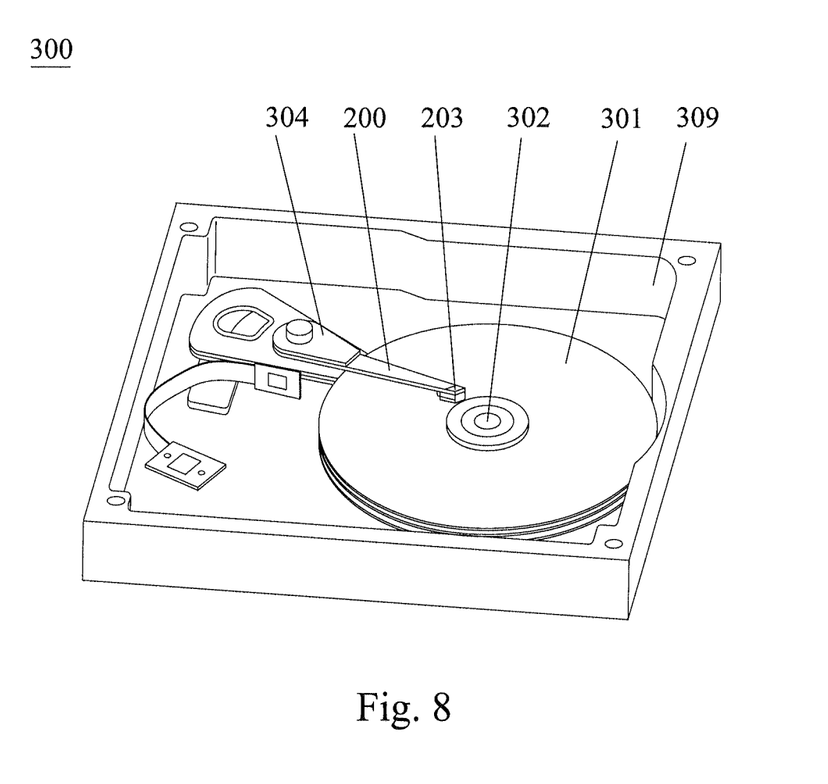
FIG. 8 is a perspective view of a disk drive unit according to an embodiment of the invention.

FIG. 8 is a disk drive unit according to an embodiment of the invention. The disk drive unit 300 comprises a HGA 200, a drive arm 304 connected to the HGA 200, a series of rotatable disks 301, and a spindle motor 302 to spin the disk 301, all of which are mounted in a housing 309. The HGA 200 includes the suspension 290 having a flexure 205 and the slider 203 as mentioned above. Because the structure and/or assembly process of disk drive unit of the present invention are well known to persons ordinarily skilled in the art, a detailed description of such structure and assembly is omitted herefrom.

Figure 9:
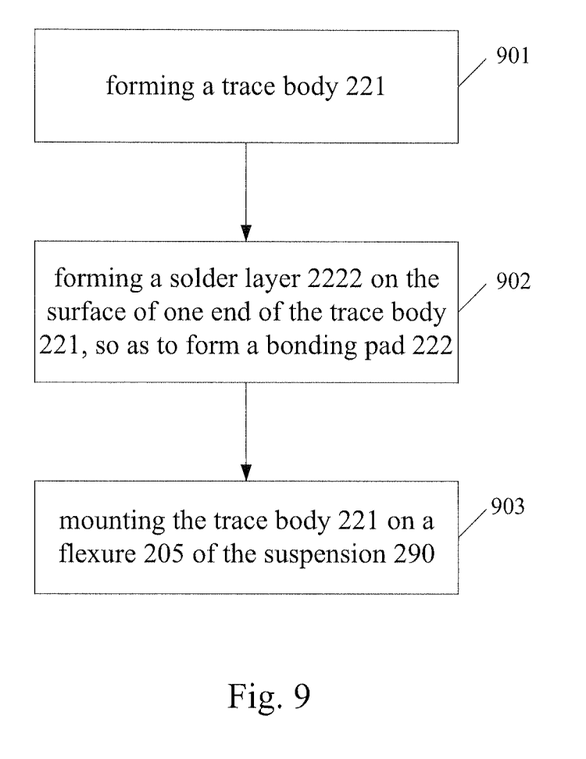
FIG. 9 is a flowchart of a manufacturing method of a suspension according to one embodiment of the present invention.

FIG. 9 shows a manufacturing method of a suspension according to one embodiment of the present invention, which includes:

Step (901), forming a trace body 221;

Step (902), forming a solder layer 2222 on the surface of one end of the trace body 221, so as to form a bonding pad 222; and Step (903), mounting the trace body 221 on a flexure 205 of the suspension 290.

Concretely, the bonding pad 222 is a free end, which is capable of bending to the trace body 221 flexibly. Preferably, the method further includes bending the bonding pad 222 to make the solder layer 2222 face to the pad 2301 on the slider 203, so as to connect with the slider 203 by fusing the solder layer 2222 to the pad 2031 on the slider 203.

More concretely, the solder layer 2222 can be formed on the trace body layer 2221 by plating, sputtering or other surface curing method.

Figure 10:
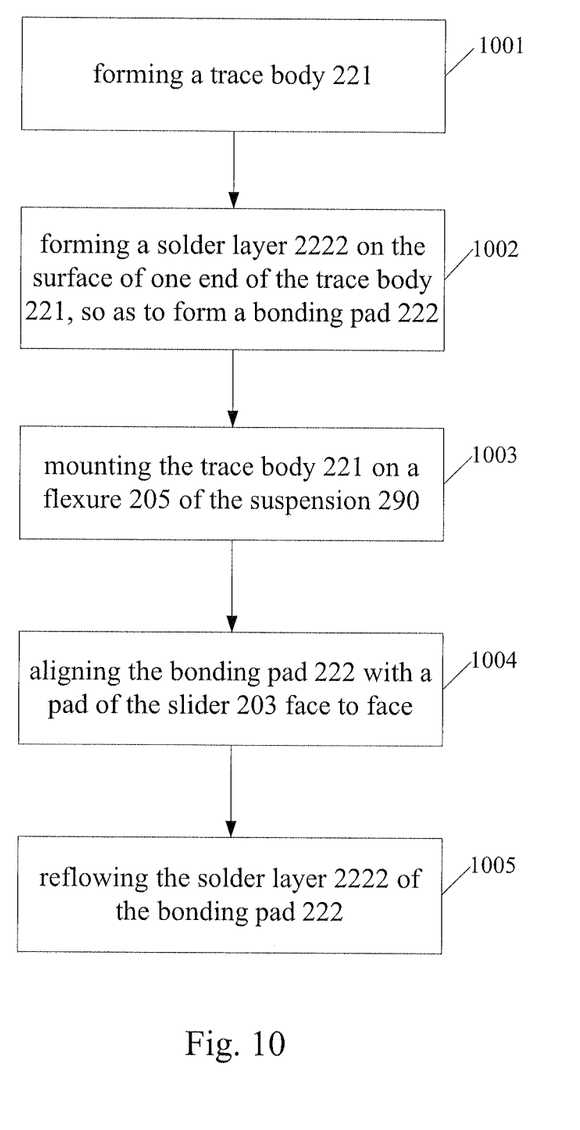
FIG. 10 shows a connecting method between a suspension and a slider according to one embodiment of the present invention.

FIG. 10 shows a connecting method between a suspension and a slider according to one embodiment of the present invention, which includes:

Step (1001), forming a trace body 221;

Step (1002), forming a solder layer 2222 on the surface of one end of the trace body 221, so as to form a bonding pad 222; and Step (1003), mounting the trace body 221 on a flexure 205 of the suspension 290.

Step (1004), aligning the bonding pad 222 with a pad 2031 of the slider 203 face to face; and Step (1005), reflowing the solder layer 2222 of the bonding pad 222, thereby connecting the suspension 290 with the slider 203.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
a flexure having a suspension tongue; and
a plurality of electrical traces formed on the flexure;
each electrical trace having a trace body and a bonding pad arranged for connecting with a slider of the head gimbal assembly, and each bonding pad being arranged on the suspension tongue, wherein the bonding pad is a free end before connecting with the slider and is capable of bending to the trace body flexibly, and the bonding pad comprises a trace body layer and a solder layer formed on the trace body layer, thereby the bonding pads of the electrical traces connecting with the slider by reflowing the solder layer to the slider.

2. The suspension according to claim 1, wherein the solder layer is made of Sn based material.

3. The suspension according to claim 1, wherein the solder layer is made of gold.

4. The suspension according to claim 1, wherein the solder layer is formed on the trace body layer by plating or sputtering.

5. The suspension according to claim 1, wherein the bonding pad is vertical with the trace body after connecting with the slider.

6. A head gimbal assembly, comprising:
a slider; and
a suspension supporting the slider;
the suspension comprising:
a flexure having a suspension tongue; and
a plurality of electrical traces formed on the flexure;
each electrical trace having a trace body and a bonding pad arranged for connecting with the, and each bonding pad being arranged on the suspension tongue, wherein the bonding pad is a free end before connecting with the slider and is capable of bending to the trace body flexibly, and the bonding pad comprises a trace body layer and a solder layer formed on the trace body layer, thereby the bonding pads of the electrical traces connecting with the slider by reflowing the solder layer to the slider.

7. A disk drive unit, comprising:
a head gimbal assembly including a slider and a suspension that supports the slider;
a drive arm connected to the head gimbal assembly;
a series of disks; and
a spindle motor operable to spin the disks;
the suspension comprising:
a flexure having a suspension tongue; and
a plurality of electrical traces formed on the flexure;
each electrical trace having a trace body and a bonding pad arranged for connecting with the, and each bonding pad being arranged on the suspension tongue, wherein the bonding pad is a free end before connecting with the slider and is capable of bending to the trace body flexibly, and the bonding pad comprises a trace body layer and a solder layer formed on the trace body layer, thereby the bonding pads of the electrical traces connecting with the slider by reflowing the solder layer.

8. A manufacturing method of a suspension for a head gimbal assembly, comprising:
forming a trace body;
forming a solder layer on the surface of one end of the trace body, so as to form a bonding pad which is a free end and is capable of bending to the trace body flexibly, so as to connect with a slider of the head gimbal assembly; and
mounting the trace body on a suspension tongue of a flexure of the suspension.

9. The manufacturing method according to claim 8, further comprising forming the solder layer on the surface of one end of the trace body by plating or sputtering.

10. The manufacturing method according to claim 8, wherein the solder layer is made of Sn based material.

11. The manufacturing method according to claim 8, wherein the solder layer is made of gold.

12. A connecting method between a suspension and a slider, comprising:
forming a trace body;
forming a solder layer on the surface of one end of the trace body, so as to form a bonding pad which is a free end and is capable of bending to the trace body flexibly;
mounting the trace body on a suspension tongue of a flexure of the suspension;
aligning the bonding pad with a pad of the slider face to face; and
reflowing the solder layer of the bonding pad to the pad of the slider, thereby connecting the suspension with the slider.

* * * * *